United States Patent

[11] 3,553,415

| [72] | Inventor | Dean C. Girard<br>San Leandro, Calif. |
|---|---|---|
| [21] | Appl. No. | 769,981 |
| [22] | Filed | Oct. 23, 1968 |
| [45] | Patented | Jan. 5, 1971 |
| [73] | Assignee | Jean La Force<br>Fort Worth, Tex.<br>a part interest |

[54] ELECTRIC DISCHARGE MACHINING EMPLOYING GAS DISPERSED IN A LIQUID DIELECTRIC
5 Claims, 1 Drawing Fig.

[52] U.S. Cl. .................................................... 219/69,
204/143; 219/74
[51] Int. Cl. ...................................................... B23p 1/04,
B23p 1/08

[50] Field of Search............................................ 219/69D,
69E, 72, 74, 75, 69M, 70; 204/143(ECM)

[56] References Cited
UNITED STATES PATENTS

| 2,526,423 | 10/1950 | Rudorff..................... | 219/69(D) |
| 2,821,615 | 1/1958 | Fannon ..................... | 219/72X |
| 2,996,602 | 8/1961 | Webb.......................... | 219/69(D) |
| 3,385,947 | 5/1968 | Inoue .......................... | 219/69(M) |

Primary Examiner—R. F. Staubly
Attorney—Gardner & Zimmerman

ABSTRACT: A spark erosion machining apparatus having a dielectric coolant feed system is described which incorporates into the liquid dielectric, prior to injection thereof into the spark gap between the electrode and the workpiece, a material component productive of a dispersed gas phase for accelerating swarf removal and machining rates.

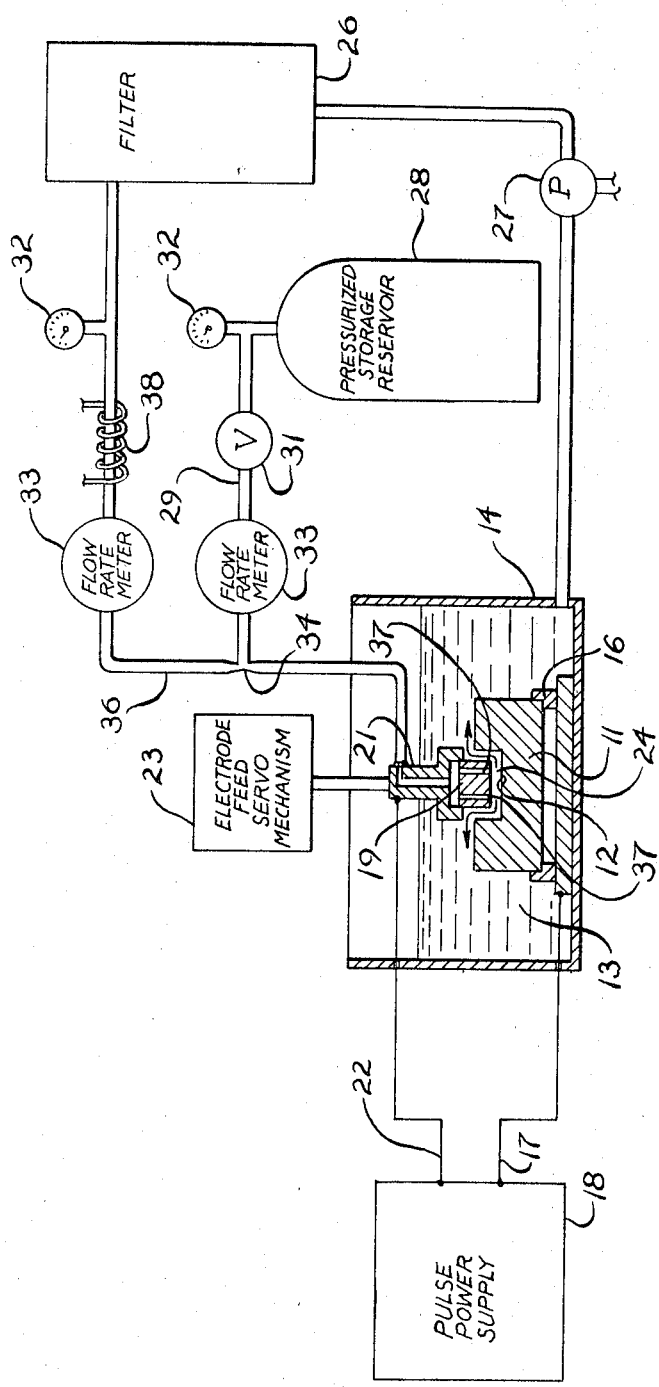

3,553,415

ELECTRIC DISCHARGE MACHINING EMPLOYING GAS DISPERSED IN A LIQUID DIELECTRIC

BACKGROUND OF THE INVENTION

The invention relates generally to electrical discharge machining, and, more particularly to a dielectric fluid feed system for such machining which effectively flushes the spark gap between the electrode and the workpiece with a dielectric liquid having an inert gas intimately disposed therethrough.

In order to improve machining speeds, modern spark-machining equipment with specialized power supplies have been able to achieve machining rates of over 20 grams of steel per minute for example. However, quality surface finishes cannot be obtained and the work must be transferred to conventional equipment of the RC relaxation circuit type for finishing, offsetting in large measure the gains which can be made.

In the case of existing conventional equipment of the pulse circuit and RC relaxation circuit type, the rapidity with which material can be removed is essentially limited by the surface finish requirement and the maximum permissible radius of curvature tolerance of corners and projections. In general, initial "roughing" cuts are made with worn electrodes to remove as much material as rapidly as a uniform cut can be made. In all subsequent and finishing operations, however, the current and voltage parameters are limited to a maximum permissible value by the surface finish and corner radii mentioned above. Since the surface removal rates are a function of pulse energy, i.e. pulse current and voltage, it was heretofore not considered possible to further improve the machining speed of such machinery.

SUMMARY OF THE INVENTION

Contrary to current thought, I have now discovered a way in which the material removal rates of conventional equipment can be increased further, in some cases by as much as 40 per cent, without compromising surface finish or corner radius tolerances. This improvement can be achieved with the standard unaltered pulse and RC circuitry and with the equipment operated in the usual manner, i.e. with electrode feed, spark length, material removal rate, and surface finish settings made substantially in accordance with standard procedures. The present improvements are achieved entirely by modification of the dielectric feed circuit of such machinery. More specifically, I modify the dielectric coolant composition prior to injection thereof into the spark gap between the electrode and the workpiece by incorporating therein low break down resistance components selected from gases and gas forming substances which are inert with respect to the electrode and work materials. Compounds suitable for this purpose are the noble gases, carbon dioxide and nitrogen. The manner in which these gases are introduced into the dielectric fluid is through a junction between the fluid circuit and a feed line from a pressurized gas reservoir, preferably in the form of one or more narrow restricted orifices near the electrode quill inlet for producing a finely dispersed gas phase in the dielectric within the spark gap. The dielectric is removed from the spark gap in the usual manner, i.e. it flows into the tank and is recirculated by means of a pump through the filteration system. The gas phase, however, escapes and is replenished from the reservoir. The quantity of gas introduced into the dielectric is variable within wide limits by means of a pressure regulator valve in the gas feed line. As indicated above, the workpiece material removal rates were found to increase by as much as 40 per cent. In addition, however, a significant reduction in electrode wear was also observed, which further improves the economics of the present spark-machining method.

In summary, the principal object and feature of advantage of the present invention is to provide an improved removal efficiency of workpiece material by altering the electrical break down characteristics of the dielectric coolant fluid.

Another object of the invention is to provide a dielectric coolant capable of protecting the electrode material against oxidation to enhance the wear ratio thereof.

Yet another object of the invention is to provide a mechanism for accelerated transport and removal of swarf particles from the spark gap.

A still further object of the invention is to provide a dielectric which evolves a nonflammable gas in the dielectric tank for reducing the fire hazard therein.

The invention possesses other objects and features of advantage, some of which, with the foregoing will be set forth in the following description of the preferred form of the invention which is illustrated in the drawings.

BRIEF DESCRIPTION OF THE DRAWING

The FIG. of the drawing is a schematic cross-sectional illustration of the preferred dielectric fluid feed system of the present invention.

DESCRIPTION OF THE PREFERRED EMBODIMENT

With reference to the drawing, workpiece 11, shown partially eroded in the central upper portion 12, is submerged in a bath of dielectric fluid 13 confined in tank 14. The work 11 is firmly in place by means of jig 16 and is electrically connected with terminal 17 of pulse power source 18. Electrode 19 is affixed to quill 21 and is electrically connected to the other terminal 22 of the power supply 18. The electrode feed servomechanism 23 is mechanically linked to the quill 21 for feeding the electrode 19 downwardly into the recessed cut 12 of the workpiece, maintaining gap 24 between workpiece 11 and electrode constant as the workpiece is eroded.

The apparatus as discussed hereinbefore is generally in accord with prior art spark-machining apparatus. The dielectric fluid circulation loop derives its liquid component from the bath 13 in tank 14, from whence the dielectric fluid is forced through filter 26 by pump 27 to remove swarf and other fine particles therefrom. The cleaned dielectric is then pumped toward the quill 21.

Storage reservoir 28 contains the loss break down potential component under pressure. Typically, the storage reservoir 28 may be a conventional gas storage bottle. The desired gas component flow through feed line 29 is regulated by acting upon valve 31 to establish a gas flowrate which is in the desired proportion to the liquid flow rate. The flow rates and pressures can be ascertained from the pressure gauges 32 and flow rate meter 33 in the respective feed lines, as well as a knowledge of the pumping capacity of pump 27. The liquid and gas-forming components are combined through junction 34, which may be one or several narrow orifices leading into the liquid feed line 36, or preferably a venturi tube. The junction 34 should be located close to the inlet to quill 21 in order to forestall excessive separation of the phases. The liquid-gas mixture is then forced through the quill and electrode orifices 37 into the spark gap 24, where the gas component expands under the influence of local heating and reduced pressure and bubbles to the dielectric bath surface. The dielectric oil employed herein may be any of a variety of conventional oils employed for the same purpose in the industry, such oils are transformer insulator oils, paraffin oils, light machine oils, liquid hydrocarbons such as white spirit or kerosene or similar $C_{10}$—$C_{14}$ hydrocarbons, or commercially available dielectrics such as the various Elox oils. Such materials usually have a dielectric strength on the order of 50—200 v./mil. The gas component may be one or a combination of the following gases: helium, neon, argon, krypton, xenon, nitrogen and carbon dioxide. Trace amounts of hydrogen are beneficial for removing oxygen from the spark gap, however, the extreme danger of explosion militates against its use in measurable quantities.

The manner of feeding the dielectric to the spark through the electrode is illustrative only. It should be readily apparent that the dielectric may be administered through the workpiece as well. It is possible to also employ suction to transport the dielectric mixture through the gap; however, since this operation can only take place below atmospheric pressure, correspondingly greater phase separation with use of this method reduces the effectiveness of the present invention.

In cases where it is not possible to introduce the dielectric mixture directly into the gap, as when the dielectric is flushed towards the space between electrode and workpiece, the gas is usually lost at the surface of the dielectric bath. In these instances a liquid but highly volatile organic compound may be mixed with the dielectric oil. Such compounds should again be nonflammable and neutral with respect to the electrode materials and should have a boiling point near room temperature. Such compounds are freons, i.e., trichlorofluoromethane, dichlorodifluoromethane, carbon tetrafluoride, cryofluorane, and octafluorocyclobutane. For improved retention of these gas forming substances with the dielectric oil, the latter may be cooled somewhat to a temperature just below the boiling point of the additive, for example, by means of cooling coil 38. Moreover, the miscibility of these compounds with the dielectric may be aided by adding an emulsifying agent such as used in detergent lubricating oils. This dielectric mixture may be injected into the spark gap through an external nozzle fixture. The dispersed gas phase is then formed in situ under the heating action of the spark current.

The relative concentration of the vapor and liquid phase is widely variable between about 20 and 60 per cent by volume of gaseous dispersant. The optimal removal rate and minimal electrode wear has been observed to occur at a volume concentration ratio of about 3:2 based upon the flow rates of liquid and gas.

Example:

A die of hardened steel was produced by means of graphite electrodes. The volume of the machining job was about 10 cubic inches and the surface area of the electrode about 20 square inches. The dielectric liquid was Eloxol 06 pumped towards the spark gap at a pressure of 30 p.s.i. and a flow rate of 6 gallons per minute. The gas component utilized was a mixture of 75 per cent argon and 25 per cent carbon dioxide supplied from two storage bottles at a pressure of 35 p.s.i. each. The combined flow rate of the gas components was 4.2 gallons per minute. The material removal rate was representing an improvement of 41 per cent over the machining rate achieved under identical conditions without the use of the carbon dioxide-argon gas component.

The mechanism and reason underlying the remarkably improved performance of spark machinery equipped with the present dielectric feed system and operated in accordance with this invention have not been determined with certainty. However, as indicated by the pulse patterns observed on a monitoring oscilloscope, it appears that the reduction of the ionization potential of the dielectric causes an earlier breakdown and longer duration of the discharge spark, resulting in a net reduction of the inoperative time period between successive voltage pulses and concomitant increase in the quantity of material removed. Also, a smaller portion of the pulse energy is expended in the ionization of the dielectric. Similarly, the internal plasma resistance must be reduced in view of the greater mobility of the gas ions.

The principal contribution, however, is believed to be due to the enhanced swarf removal. The swarf particles are solidified by the cooling action of the dielectric liquid. With use of conventional liquid dielectrics the solidified particles are subjected only to the hydrodynamic forces of the surrounding liquid, which result in efficient particle transport only if the particle is free within the gap and not close to the surfaces or even within the lines. With the instant invention, these latter trapped particles are agitated and floatated into the gap and on into the dielectric bath by the expanding gas bubbles.

The reduced electrode wear may be in part due to a blanketing and shielding effect of the inert gas, keeping oxygen liberated from the oil in the course of breakdown from reaching and oxidizing the electrode surfaces. Accordingly, reduced electrode wear is thought to be primarily linked with the efficient swarf removal promoted by the gas phase.

While the foregoing description dealt primarily with the preferred embodiment of the invention, it will be readily apparent to those skilled in the art that numerous variations may be made without departing from the spirit and scope of the invention. All such variations are intended to be included in the scope of the following claims.

I claim:

1. A method for improving the machining rate in spark machining which comprises intimately mixing a dielectric liquid of high dielectric strength on the order of 100 v. per mil, selected from the group consisting of hydrocarbon liquids having between 10 and 16 carbon atoms, including kerosene and white spirits, and dielectric oils including paraffin oil, transformer oil, and light machine oils, with between 20 percent and 60 per cent by volume of at least one inert component phase having a boiling point not higher than about room temperature and low in breakdown potential as compared to the breakdown potential of said dielectric liquid, said 20 per cent to 60 per cent by volume concentration being based upon the volume displaced by said inert component phase in the gaseous phase, and thereafter injecting the mixture of said dielectric liquid and said inert components into the spark gap between the electrode and the workpiece and circulating said mixture therethrough while impressing thereon a pulsating DC potential exceeding the dielectric strength of said mixture.

2. The method of claim 1 further defined in that said inert component is selected from the group of gases consisting of helium, neon, argon, krypton, xenon, nitrogen, and carbon dioxide.

3. The method of claim 2 further defined in that said inert component phase comprises 40 per cent by volume.

4. The method of claim 3 further defined in that said inert component phase comprises 75 per cent by volume of argon and 25 per cent by volume of carbon dioxide.

5. The method of claim 1 further defined in that said inert component phase is selected from the group consisting of trichlorofluoromethane, dichlorodifluoromethane, carbon tetrafluoride, cryofluorane, and octafluorocyclobutane.